Aug. 11, 1936.　　　J. HOPE　　　2,050,949
CATTLE STANCHION
Filed Dec. 7, 1934

Inventor:
John Hope

Patented Aug. 11, 1936

2,050,949

UNITED STATES PATENT OFFICE 2,050,949

CATTLE STANCHION

John Hope, Matawai, New Zealand

Application December 7, 1934, Serial No. 756,545
In New Zealand December 20, 1933

6 Claims. (Cl. 119—98)

This invention relates to an improved cattle stanchion particularly adapted to prevent the movement of the head of an animal in the stanchion during the process of dehorning, marking or any other operation.

The invention resides in the special construction of the head or front of the stanchion, in which means for opening and closing the head holding means are situated. The particular construction will be particularly described and ascertained by reference to the accompanying drawing, in which:—

Figure 2 is a front view of the stanchion with the animal neck clamping means closed.

Figure 3 is a front view of the stanchion with the animal neck clamping means opened.

Figure 4 is a side view of the forward end of the stanchion.

Figure 1:
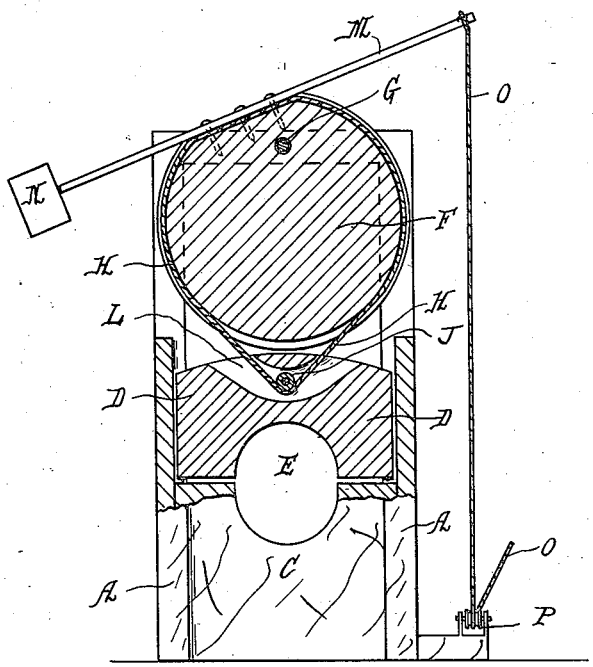
Figure 1 is a part sectional view of the head of the stanchion, on an enlarged scale.
Figure 1:
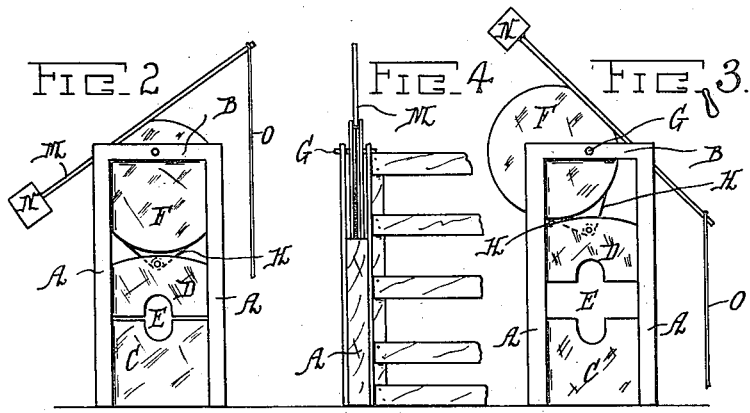

The stanchion front comprises side members A and a top cross member B. A section C is rigidly affixed between the two side members at their lower ends, while a further movable section D is so mounted vertically above the section C that it is free to slide up or down in guides formed by the said side members. The adjacent faces of these two sections C and D are each cut away to form an opening E which in shape and size approximates that of the neck of the class of animal to be held therein.

In order however to position the animal with its neck between these two sections it is necessary to raise the top one to permit of the head of the animal passing out through the front of the stanchion, upon which the top is lowered, with the desired result. The mechanism designed to effect this raising and lowering of the top section D comprises a wheel F, mounted eccentrically on a pivot pin G that is journalled in the cross bar B in such a way, that when the two sections C and D are touching, the eccentric wheel will be at the lowest point of its throw and the bottom thereof will be almost touching the top of the movable section D, which top is slightly upwardly curved.

A strap H passes in a groove around the eccentric wheel and around a small pulley wheel J journalled towards the bottom of a cut away portion L in the movable section D. A lever M is fastened tangentially to the top face of the eccentric wheel and projects on each side thereof. To the end of the lever which projects downwardly when the wheel is in its lowest position in its path of movement about the pivot G, a weight N is attached, while to the other end of this lever a rope O is affixed, which rope O may be led down to a pulley P and then to the rear of the stanchion.

The sides, bottom and rear of the stanchion may be constructed in any desired form as they do not constitute part of the invention.

In operation to open the space E to a sufficient size to permit of an animal's head passing therethrough, the rope O is pulled down. This operates the lever M which moves the eccentric wheel about its pivot point from its lowest position to a higher one as is, for instance, illustrated in Figure 3. As the eccentric wheel F is strapped to the slide D the upward movement thereof will in turn raise this section or slide in its guides. The animal is then passed into the stanchion until its head projects out through the opening E. The rope is released and the weight M causes the eccentric wheel to swing back to its original lowest position, which in turn forces the slide D down, to rest against the section C so that the neck of the animal is closely encircled and held rigidly from any movement by the edge of the wheel F locking with the slide through travelling a very slight distance beyond its dead centre.

It will be seen that by leading the rope O to the rear of the stanchion the operator can operate the opening and closing of the neck holding means from a position behind the animal, which enables him to more easily manoeuvre the animal into position.

I claim:—

1. An improved cattle stanchion having its forward or head end made with a fixed lower section and a movable top section adapted to slide vertically in guides above the lower section, and in which the adjacent faces of the two sections are so shaped that when touching they will closely encircle the neck of an animal positioned within the stanchion, and means for raising and lowering the said top section, comprising an eccentrically mounted wheel in the stanchion frame, above the movable section, and a strap encircling the wheel for transmitting reciprocatory movement to said top section.

2. An improved cattle stanchion having its forward or head end made with a fixed lower section and a movable top section adapted to slide vertically in guides above the lower section, and in which the adjacent faces of the two sections are so shaped that when touching they will closely encircle the neck of an animal positioned within the stanchion, and means for raising and lowering the said top section, comprising a wheel eccentrically mounted in the stanchion frame above the movable section, a strap encircling the wheel and connected to said section, and an actuating lever mounted on the eccentric wheel and extending substantially tangentially relative to the wheel.

3. An improved cattle stanchion having its forward or head end made with a fixed lower section and a movable top section adapted to slide vertically in guides above the lower section, and in which the adjacent faces of the two sections are so shaped that when touching they will closely encircle the neck of an animal positioned within the stanchion, and means for raising and lowering the said top section, comprising a wheel eccentrically mounted in the stanchion frame above the movable section, a strap encircling the wheel and connected to said section, a lever bar mounted on said eccentric wheel to extend tangentially thereon, and a weight at one end of the bar tending to move the eccentric to a predetermined position.

4. A cattle stanchion comprising sections for embracing the neck of an animal to be held therein, and means for effecting relative movement between said sections for gripping and releasing the animal, comprising an eccentrically mounted wheel, a flexible strap encircling said wheel and slidably connected to one of said sections, and an actuating lever mounted on said eccentric wheel.

5. A cattle stanchion comprising cooperating fixed and movable sections for embracing the neck of an animal to be held therein, a wheel eccentrically mounted adjacent the movable section for shifting said movable section toward the fixed section for gripping the animal, a flexible strap encircling said wheel and slidably connected to said movable section for drawing said movable section away from the fixed section to release the animal, a lever for actuating said wheel, and means associated with one end of said lever tending to move said eccentric wheel to a determined position.

6. A cattle stanchion comprising cooperating fixed and movable sections for embracing the neck of an animal to be held therein, a wheel eccentrically mounted adjacent the movable section for shifting said movable section toward the fixed section for gripping the animal, a flexible strap encircling said wheel and slidably connected to said movable section for drawing said movable section away from the fixed section to release the animal, and means for actuating said eccentric wheel to shift said movable section toward and away from said fixed section.

JOHN HOPE.